(12) United States Patent
Hiroe

(10) Patent No.: US 9,986,128 B1
(45) Date of Patent: May 29, 2018

(54) IMAGE FORMING APPARATUS AND IMAGE FORMING METHOD FACILITATING PROCESSING COLOR

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yoshihito Hiroe, Tagata Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/455,454

(22) Filed: Mar. 10, 2017

(51) Int. Cl.
  *H04N 1/40* (2006.01)
  *H04N 1/00* (2006.01)

(52) U.S. Cl.
  CPC ..... *H04N 1/40068* (2013.01); *H04N 1/00037* (2013.01); *H04N 1/00045* (2013.01); *H04N 1/40062* (2013.01); *H04N 2201/0094* (2013.01)

(58) Field of Classification Search
  CPC .......... H04N 1/40068; H04N 1/00045; H04N 1/40062; H04N 1/00037; H04N 2201/0094
  See application file for complete search history.

(56) References Cited

U.S. PATENT DOCUMENTS

| 8,417,027 | B2 | 4/2013 | Takeshita | |
|---|---|---|---|---|
| 2002/0150292 | A1* | 10/2002 | O'Callaghan | G06K 9/0061 382/167 |
| 2003/0002733 | A1* | 1/2003 | Tsai | G06T 5/50 382/165 |
| 2003/0035673 | A1* | 2/2003 | Yamakawa | G06T 5/20 400/76 |
| 2003/0072044 | A1* | 4/2003 | Hashiguchi | G06T 7/0004 358/520 |
| 2006/0008139 | A1* | 1/2006 | Hirota | H04N 1/56 382/162 |
| 2007/0285733 | A1* | 12/2007 | Sadowara | H04N 1/32358 358/445 |
| 2011/0013241 | A1* | 1/2011 | Ohara | H04N 1/00023 358/518 |
| 2011/0052051 | A1* | 3/2011 | Takeshita | G06T 1/00 382/165 |
| 2011/0170141 | A1* | 7/2011 | Yamaguchi | H04N 1/52 358/3.05 |
| 2013/0259364 | A1* | 10/2013 | Shindo | G06K 9/4652 382/164 |
| 2016/0080706 | A1* | 3/2016 | Kaiser | H04N 5/332 348/280 |
| 2016/0092754 | A1* | 3/2016 | Kuznetsov | G06K 9/72 382/282 |

\* cited by examiner

*Primary Examiner* — Ming Hon
(74) *Attorney, Agent, or Firm* — Amin, Turocy & Watson LLP

(57) ABSTRACT

There is provided an image forming apparatus of an embodiment including a resolution converting unit, a color information calculating unit, and a color pixel determining unit. The resolution converting unit decreases image resolution of read image data. The color information calculating unit calculates color information that is used in determination of whether a pixel is a color pixel or a non-color pixel, based on a value of an RGB signal of the pixel which configures the image data. The color pixel determining unit determines whether the pixel is either the color pixel or the non-color pixel, based on the color information, and changes a criterion of selecting the color pixel based on the color information.

20 Claims, 14 Drawing Sheets

MAIN SCANNING
SUB SCANNING
HEAD
TAIL END
IMAGE MAPPING/RASTER IMAGE INPUT

| R | | G | | B | |
|---|---|---|---|---|---|
| INPUT VALUE | OUTPUT VALUE | INPUT VALUE | OUTPUT VALUE | INPUT VALUE | OUTPUT VALUE |
| 0 | 0 | 0 | 0 | 0 | 0 |
| 1 | 1 | 1 | 1 | 1 | 1 |
| 2 | 1 | 2 | 2 | 2 | 2 |
| 3 | 2 | 3 | 2 | 3 | 3 |
| ... | ... | ... | ... | ... | ... |
| 253 | 238 | 253 | 243 | 253 | 248 |
| 254 | 239 | 254 | 244 | 254 | 249 |
| 255 | 240 | 255 | 245 | 255 | 250 |

LUT CONVERSION PROCESSING

IMAGE FORMING APPARATUS AND IMAGE FORMING METHOD FACILITATING PROCESSING COLOR

FIELD

Embodiments described herein relate generally to an image forming apparatus and an image forming method.

BACKGROUND

In order to select toner that is used to form an image, whether a read image is a color original document or non-color original document is determined. This determination is performed on a per pixel basis of the read image in some cases.

However, when the determination is performed on the per pixel basis, a non-color pixel can be erroneously determined to be a color pixel due to noise produced when the image is read, in some instances.

DETAILED DESCRIPTION

An image forming apparatus of an embodiment includes a resolution converting unit, a color information calculating unit, and a color pixel determining unit. The resolution converting unit decreases image resolution of read image data. The color information calculating unit calculates color information that is used in determination of whether a pixel is a color pixel or a non-color pixel, based on values of RGB signals of the pixel which configures the image data. The color pixel determining unit determines whether the pixel is either the color pixel or the non-color pixel, based on the color information, and changes a criterion of selecting the color pixel based on the color information.

Figure 1:
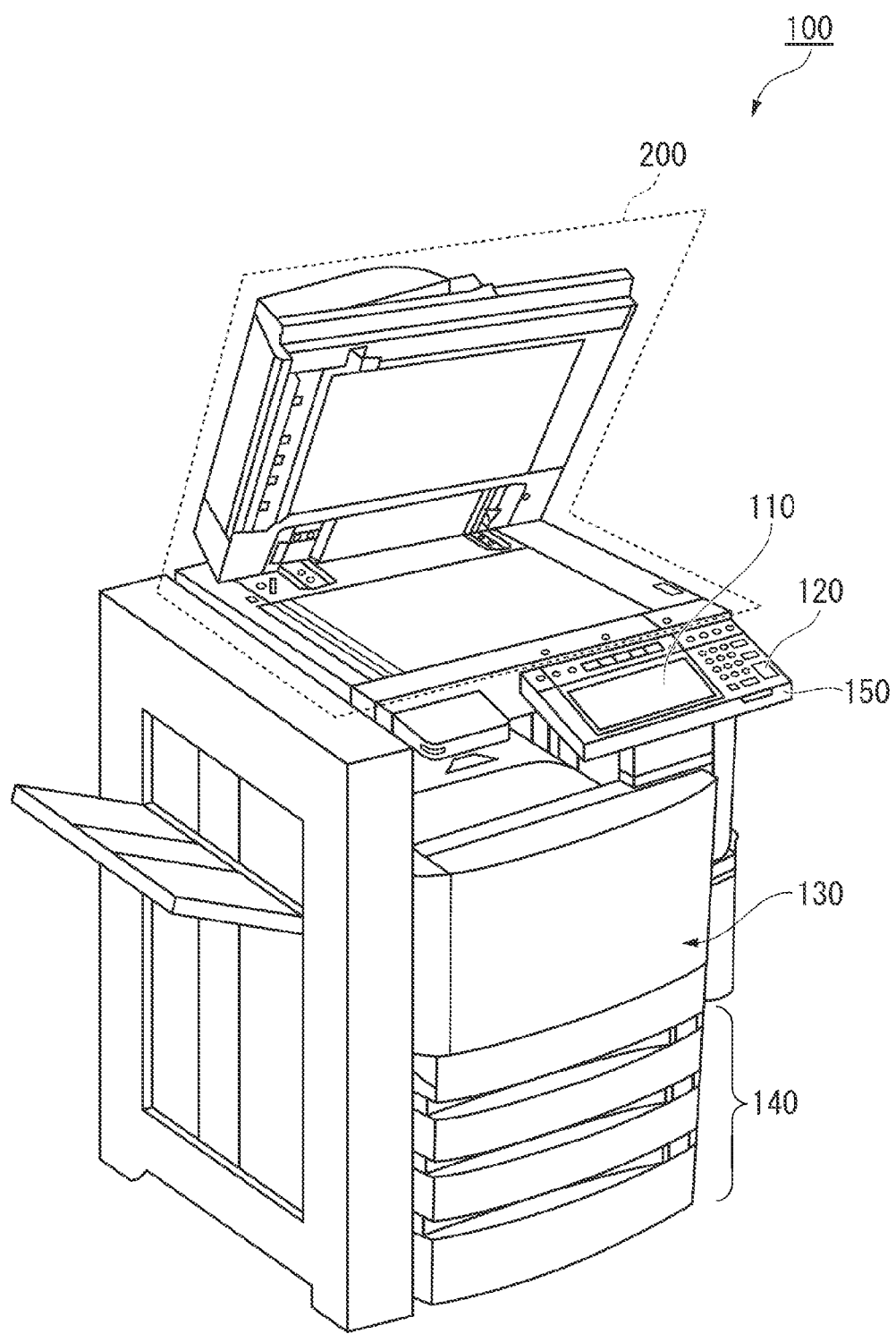
FIG. 1 is a diagram of an external appearance illustrating an example of an entire configuration of an image forming apparatus of an embodiment.

FIG. 1 is a diagram of an external appearance illustrating an example of an entire configuration of an image forming apparatus 100 of an embodiment. For example, the image forming apparatus 100 is a multifunction printer. The image forming apparatus 100 includes a display 110, a control panel 120, a printer device 130, a sheet container 140, and an image reading device 200. Note that the printer device 130 of the image forming apparatus 100 may be a device that fixes a toner image or an ink jet type device.

The image forming apparatus 100 forms an image on a sheet using developer such as toner. For example, the sheet is paper or label paper. The sheet may be any objects as long as the image forming apparatus 100 can form an image on a front surface of the object.

The display 110 is an image displaying device such as a liquid crystal display or an organic electroluminescence (EL) display. The display 110 displays various items of information related to the image forming apparatus 100. The display 110 is disposed on an operation panel 150.

The control panel 120 has a plurality of buttons. The control panel 120 receives an operation of a user. The control panel 120 outputs, to a controller of the image forming apparatus 100, a signal in response to the operation performed by the user. Note that the display 110 and the control panel 120 may be configured as an integral touch panel. The control panel 120 is disposed on the operation panel 150.

The printer device 130 forms an image on a sheet, based on image information generated by the image reading device 200 or image information received via a communication path. For example, the printer device 130 forms the image through the following process. An image forming unit of the printer device 130 forms an electrostatic latent image on a photoconductive drum, based on the image information. The image forming unit of the printer device 130 forms a visible image by attaching the developer to the electrostatic latent image. A specific example of the developer is the toner. A transfer unit of the printer device 130 transfers the visible image onto the sheet. A fixing unit of the printer device 130 fixes the visible image onto the sheet by applying heat and pressure to the sheet. Note that the sheet, on which the image is formed, may be a sheet contained in the sheet container 140 or may be a sheet inserted by hand.

The sheet container 140 contains the sheets that are used to form the image in the printer device 130.

The image reading device 200 reads image information of a reading target as brightness and darkness of light. The image reading device 200 records the read image information. The recorded image information may be transmitted to another information processing device via a network. The recorded image information may be formed as an image on a sheet by the printer device 130.

Figure 2:
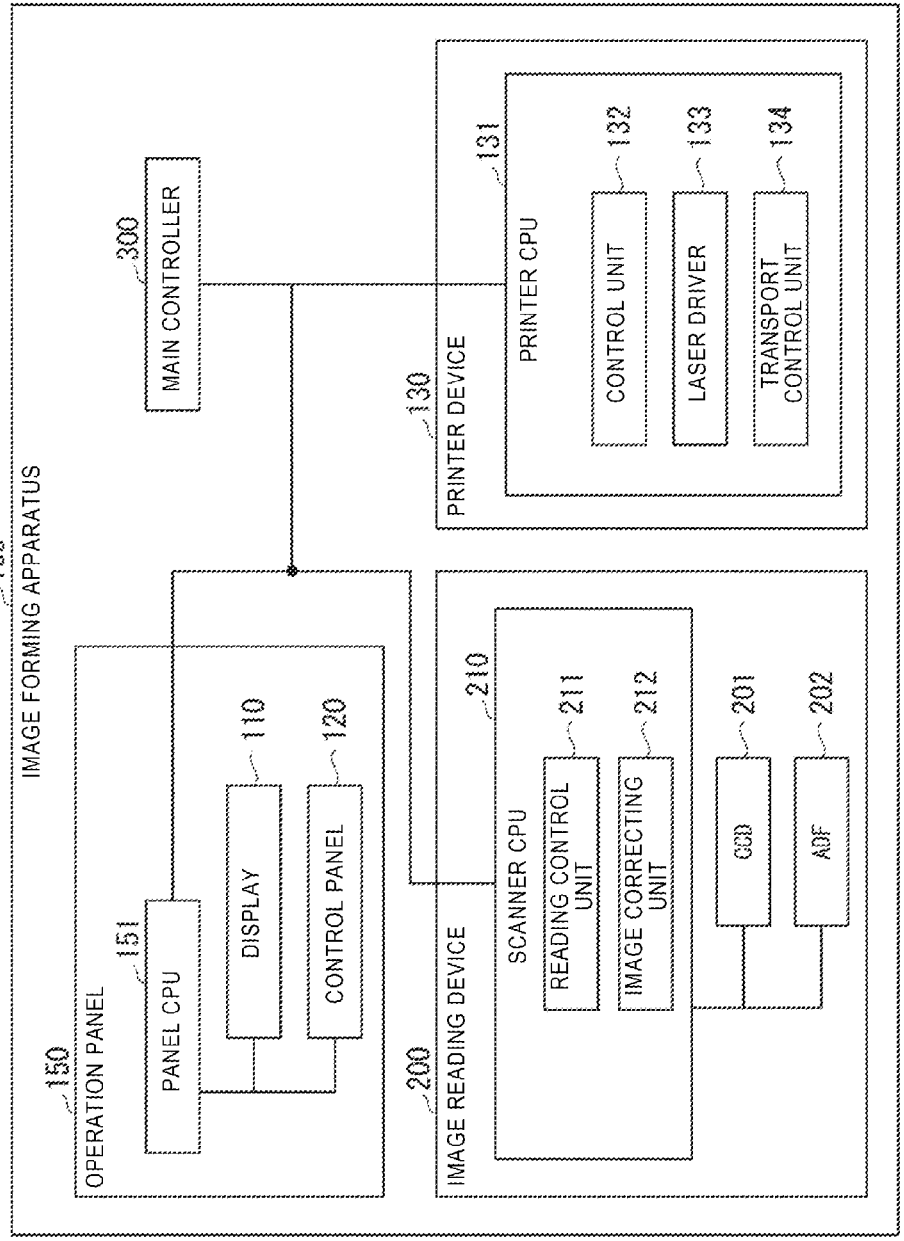
FIG. 2 is a functional block diagram representing a functional configuration of the image forming apparatus of the embodiment.

FIG. 2 is a functional block diagram representing a functional configuration of the image forming apparatus 100 of the embodiment. The image forming apparatus 100 includes the printer device 130, the operation panel 150, the image reading device 200, and the main controller 300.

The printer device 130 includes a printer central processing unit (CPU) 131. The printer CPU 131 executes an image forming program, thereby functioning as a control unit 132, a laser driver 133, and a transport control unit 134.

The control unit 132 controls operations of elements of the printer device 130. The laser driver 133 turns on or off a laser, based on the image data, thereby forming the electrostatic latent image on the photoconductive drum. The transport control unit 134 performs control such that the sheet is transported into the printer device 130 when the image is formed on the sheet.

The image reading device 200 includes a scanner CPU 210, a charge coupled device (CCD) 201, and an auto document feeder (ADF) 202. The scanner CPU 210 executes an image reading program, thereby functioning as a reading control unit 211 and an image correcting unit 212.

The reading control unit 211 reads, in a raster format, an original document disposed in the image reading device 200. The raster format means an image format in which information of color and density is recorded on a per pixel basis. The reading control unit 211 analyzes values of RGB signals of the read original document and generates image data.

The image correcting unit 212 performs color conversion and expansion or contraction on the read image data.

The CCD 201 is a solid-state imaging element. The CCD 201 converts light emitted from the original document into an electrical signal. The CCD 201 outputs the converted electrical signal as an image signal to the image correcting unit 212.

The ADF 202 is capable of continuously reading a plurality of original documents disposed in the image reading device 200.

Figure 3:
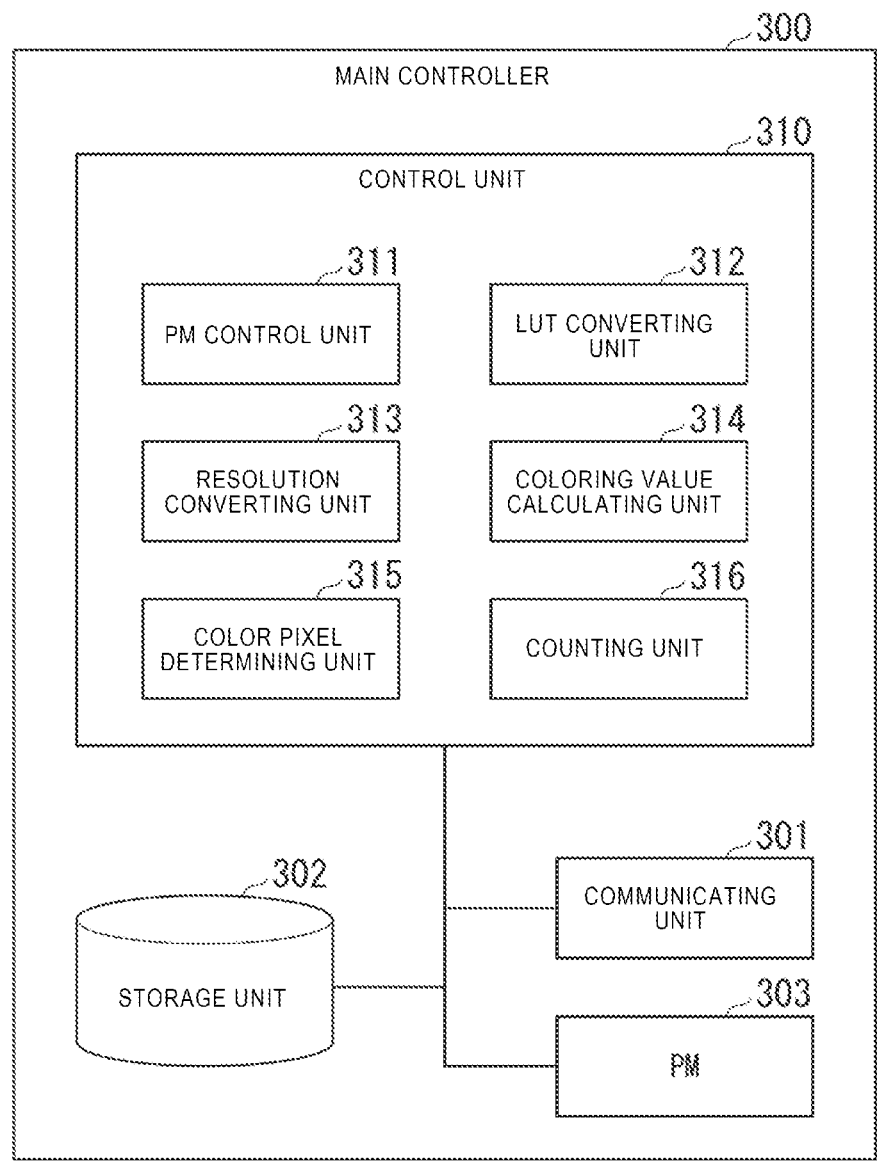
FIG. 3 is a functional block diagram representing a functional configuration of a main controller of the embodiment.

FIG. 3 is a functional block diagram representing a functional configuration of the main controller 300 of the embodiment. The main controller 300 executes a color-pixel determining program, thereby functioning as a communicating unit 301, a storage unit 302, a page memory (PM) 303, and a control unit 310.

The communicating unit 301 is a network interface. The communicating unit 301 is activated by a device including, for example, a local area network (LAN) or a modem. The communicating unit 301 receives a print job representing an instruction of forming an image from an information processing device such as a computer or a server.

The storage unit 302 stores information such as the read image data and programs which needs to be used in an operation of the image forming apparatus 100. The storage unit 302 is activated by a device including, for example, a read only memory (ROM), a random access memory (RAM), a nonvolatile random access memory (NVRAM), or a hard disk drive (HDD).

The PM 303 stores the image data. The PM 303 outputs the image data on a per page basis to the control unit 310 of the image forming apparatus 100 in response to an instruction of a PM control unit 311.

The control unit 310 controls operations of elements of the image forming apparatus 100. The control unit 310 is realized by a device including, for example, an application specific integrated circuit (ASIC). The control unit 310 executes the color-pixel determining program, thereby functioning as the PM control unit 311, a lookup table (LUT) converting unit 312, a resolution converting unit 313, a coloring value calculating unit 314, a color pixel determining unit 315, and a counting unit 316. The control unit 310 may be realized by a CPU, instead of the ASIC.

The PM control unit 311 controls the operation of the PM 303, thereby outputting the image data stored in the PM 303 to the control unit 310 of the image forming apparatus 100.

The LUT converting unit 312 performs an LUT converting process on the values of the RGB signals of the image data. The LUT converting process is performed using a lookup table. The lookup table is a table in which an output value is stored in advance with respect to an input value. The LUT converting unit 312 acquires output values corresponding to input values of the RGB signals from the lookup table. The LUT converting process is used in signal correction such as removing background data of the sheet on the values of the RGB signals of the read image information.

The resolution converting unit 313 decreases image resolution of the image data through the resolution converting process. The resolution converting unit 313 decreases screen resolution and removes noise produced during the reading of the image information. The noise means a shift of a peak position of a reading signal. When the peak position shifts, the values of the read RGB signals change and the image is determined to be a color image although the image is the non-color image.

An example of the resolution converting process includes a method in which a memory amount is saved or easy circuitization is performed. As the resolution converting process, any methods may be used as long as it is possible to decrease the image resolution.

The coloring value calculating unit 314 calculates a coloring value, based on the values of the RGB signals of a pixel. By using the coloring value, the color pixel determining unit 315 determines whether the pixel is the color pixel or the non-color pixel. If the pixel is the non-color pixel, the values of the RGB signals are substantially the same. Specifically, relationships of $R \cong G \cong B$, $R-G \cong 0$, and $G-B \cong 0$ are established. Here, R, G, and B are the values of the RGB signals of the pixel. In this respect, if the pixel is the color pixel, values of R−G and G−B increase. Hence, the coloring values are represented by a circle with an RGB expression $((R-G)^2+(G-B)^2)$. The coloring value calculating unit 314 is an example of the color information calculating unit. The coloring value is an example of the color information. The color information contains the brightness value and color signal values of RGB.

The color pixel determining unit 315 determines whether the pixel (hereinafter, referred to as a "target pixel") as a determination target is the color pixel or the non-color pixel, based on the values of the coloring values. For example, the color pixel determining unit 315 performs automatic color selector (ACS) is performed by using the circuit inside the ASIC. The color pixel determining unit 315 outputs determination results to the counting unit 316.

The counting unit 316 counts the number of pixels which are determined to be the color pixels by the color pixel determining unit 315. If the number of color pixels is larger than a predetermined threshold value, the counting unit 316 determines that the original document is the color original document. If the count number of color pixels is smaller than or equal to the predetermined threshold value, the counting unit 316 determines that the original document is the black-and-white original document. For example, the predetermined threshold value may be a predetermined number. The counting unit 316 may perform determination for each sheet of the original document which is read, or may perform determination after a plurality of sheets are read.

Figures 4, 5:
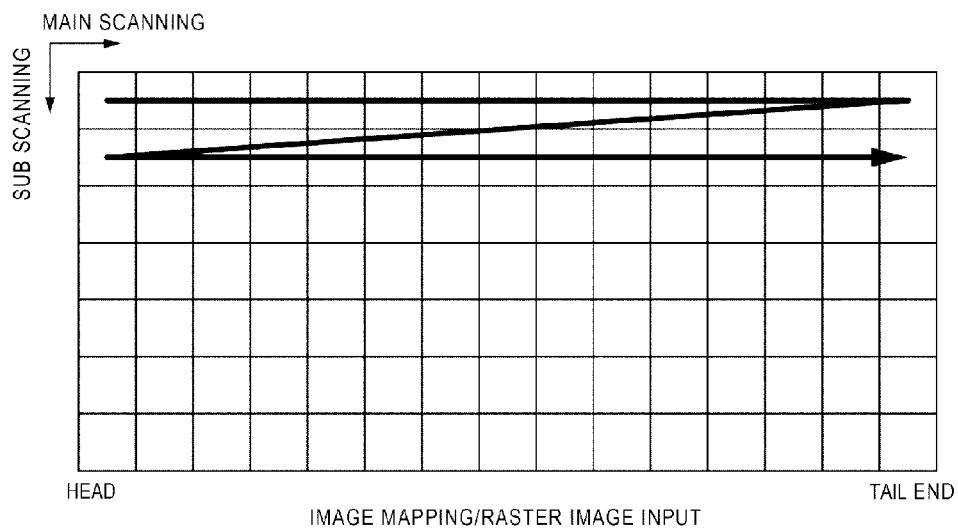
FIG. 4 is a diagram illustrating flow of processing of an image that is read in a raster format of the embodiment.
FIG. 5 is a diagram illustrating a specific example of a lookup table of the embodiment.

FIG. 4 is a diagram illustrating flow of processing of the image that is read in a raster format of the embodiment. The image reading device 200 reads the disposed original document in the main-scanning direction. When the image reading device 200 reads the original document to a tail end in the main-scanning direction, the reading position of the original document is caused to move in the sub-scanning direction. The image reading device 200 reads the original document in the main-scanning direction from a head in the main-scanning direction. The image reading device 200 repeats reading to the tail ends in the main-scanning direction and the sub-scanning direction. The image reading device 200 generates values of RGB signals on the per pixel basis, when the original document is read.

FIG. 5 is a diagram illustrating a specific example of the lookup table of the embodiment.

The lookup table has a lookup record. The lookup record has values of an input value and an output value of the RGB colors, respectively. The input values are the values of the RGB signals of the read image information. The output values are values obtained after the signal correction is performed on the input value, in order to remove the background data of the original document. The output value represents strength of signals of colors when the image forming is performed. The strength of the signal influences luminance of the image. When the output value is large, the image is bright. In this respect, when the output value is small, the image is dark.

In an example illustrated in FIG. 5, in the uppermost record of the lookup table, a value of an input value of R is "0", a value of an output value of R is "0", a value of an input value of G is "0", a value of an output value of G is "0", a value of an input value of B is "0", and a value of an output value of B is "0". Hence, according to the uppermost record of the lookup table, if the values of the RGB signals of the read image information are 0 in all of R, G, and B, the image is formed with the black signal. Note that the lookup table illustrated in FIG. 5 is only a specific example. Therefore, the lookup table may be configured as an example which is different from that in FIG. 5. For example, the lookup table may be generated for each color.

Figure 6:
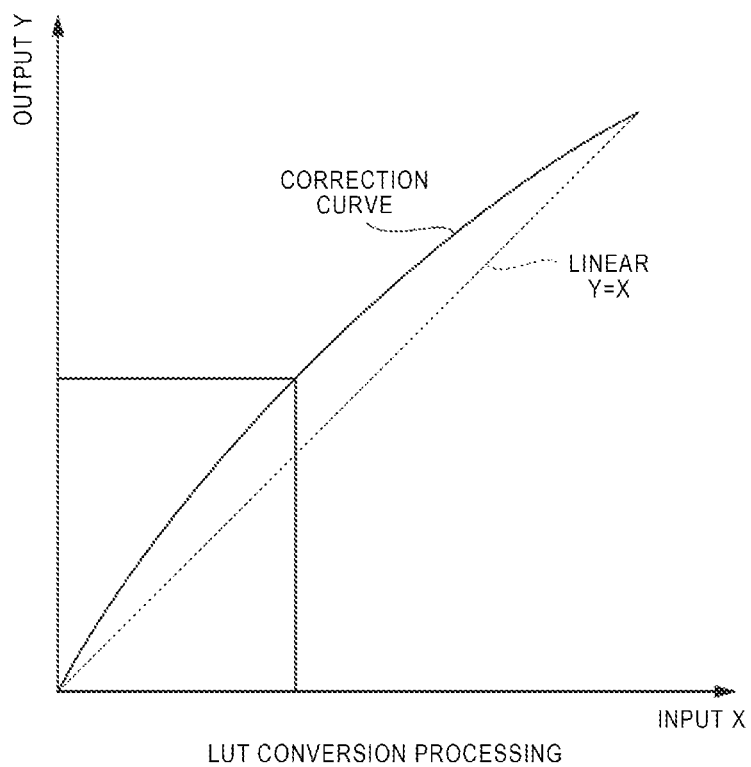
FIG. 6 is a graph representing a relationship between input and output, based on the lookup table of the embodiment.

FIG. 6 is a graph representing a relationship between the input and output, based on the lookup table of the embodiment. If the LUT converting process is not performed, the value of the input X and the value of the output Y have a linear relationship. The LUT converting unit 312 uniquely determines a value of the output Y with respect to the value of the input X by referring to the lookup table.

Next, a case where the resolution converting unit 313 performs averaging of four pixels on the image data in both of the main-scanning direction and the sub-scanning direction, and the image resolution is decreased by one fourth in each of the main-scanning direction and the sub-scanning direction will be described in detail. The resolution converting process is performed on colors of RGB. Hereinafter, the process for one color will be described in detail.

Figure 7:
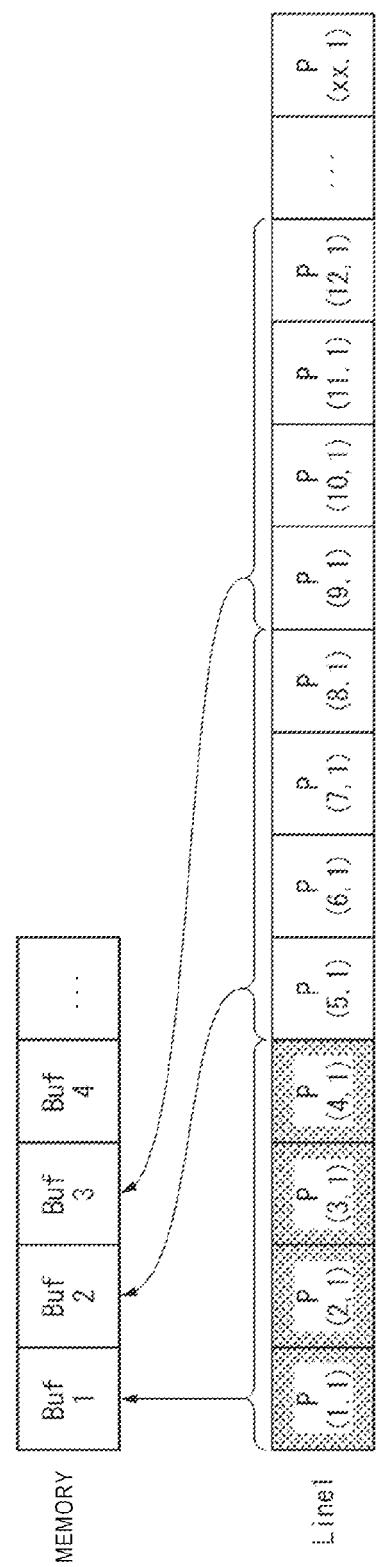
FIG. 7 is a diagram schematically illustrating a resolution converting process of the first line in a method of saving a memory amount of the embodiment.

FIG. 7 is a diagram schematically illustrating the resolution converting process of the first line in the method of saving the memory amount of the embodiment. The resolution converting unit 313 calculates an average value Pave of four pixels P(1, 1), P(2, 1), P(3, 1), and P(4, 1) on the first line in the main-scanning direction. The resolution converting unit 313 causes a memory Buf[1] to store Pave. The resolution converting unit 313 calculates an average value Pave of the next four pixels P(5, 1), P(6, 1), P(7, 1), and P(8, 1) in the main-scanning direction. The resolution converting unit 313 causes a memory Buf[2] to store Pave. The resolution converting unit 313 performs the calculation of Pave on the pixels on the first line in the main-scanning direction.

Figure 8:
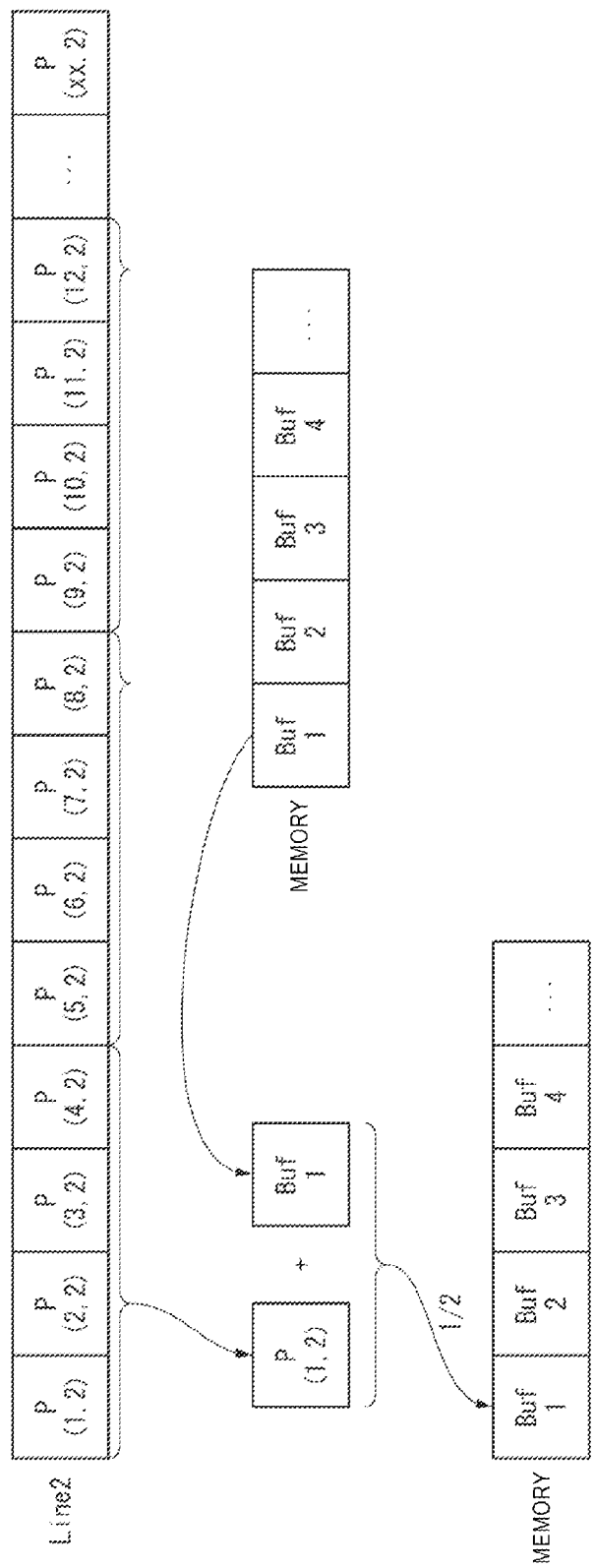
FIG. 8 is a diagram schematically illustrating the resolution converting process of the second line in the method of saving the memory amount of the embodiment.

FIG. 8 is a diagram schematically illustrating the resolution converting process of the second line in the method of saving the memory amount of the embodiment. The resolution converting unit 313 calculates an average value Pave of four pixels P(1, 2), P(2, 2), P(3, 2), and P(4, 2) on the second line in the main-scanning direction. The resolution converting unit 313 acquires values of Buf[1] in which Pave and an average value of the first line are stored. The resolution converting unit 313 computes an average value ((Pave+Buf[1])÷2). The resolution converting unit 313 causes the memory Buf[1] to store the computing result. The resolution converting unit 313 calculates an average value Pave of the next four pixels P(5, 2), P(6, 2), P(7, 2), and P(8, 2) in the main-scanning direction. The resolution converting unit 313 acquires values of Buf[2] in which Pave and an average value of the second line are stored. The resolution converting unit 313 computes an average value ((Pave+Buf[2])÷2). The resolution converting unit 313 causes the memory Buf[2] to store the computing result. The resolution converting unit 313 performs the calculation on the pixels on the second line in the main-scanning direction.

Figure 9:
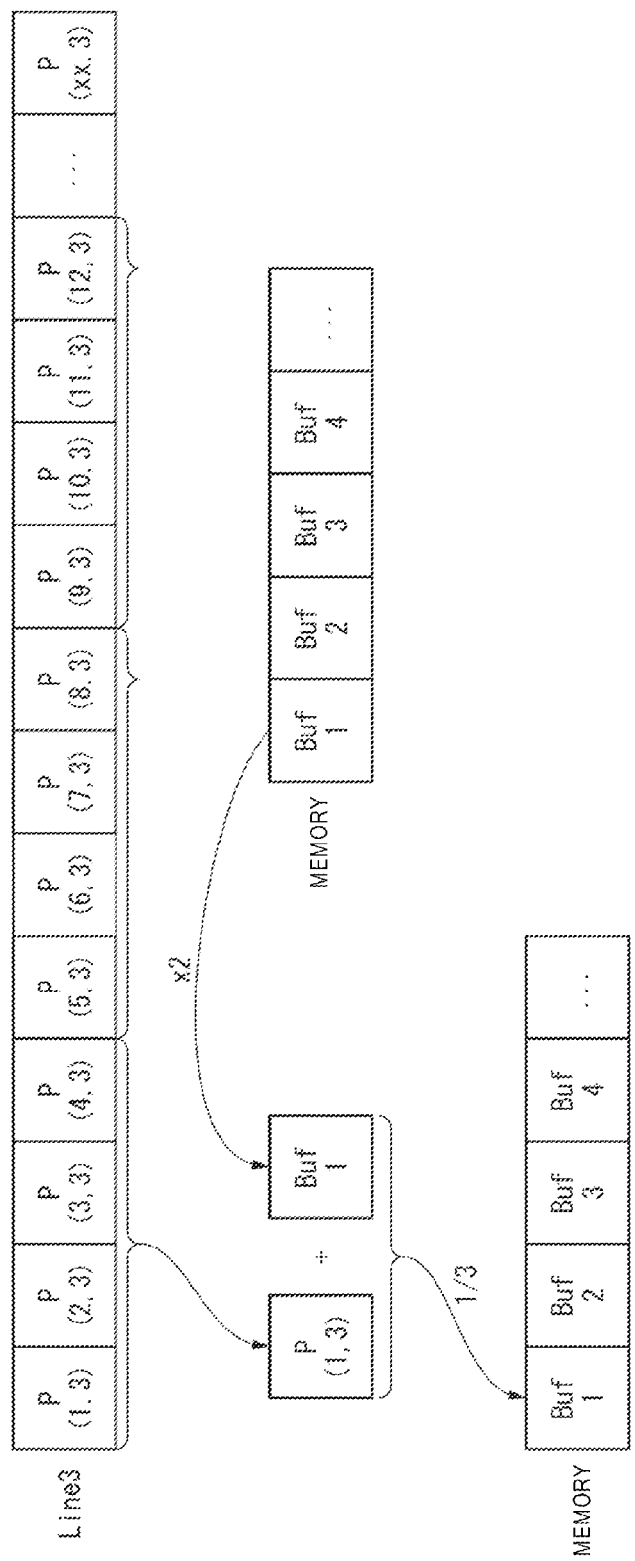
FIG. 9 is a diagram schematically illustrating the resolution converting process of the third line in the method of saving the memory amount of the embodiment.

FIG. 9 is a diagram schematically illustrating the resolution converting process of the third line in the method of saving the memory amount of the embodiment. The resolution converting unit 313 calculates an average value Pave of four pixels P(1, 3), P(2, 3), P(3, 3), and P(4, 3) on the third line in the main-scanning direction. The resolution converting unit 313 acquires values of Buf[1] in which Pave and the average values of the first line and the second line are stored. The resolution converting unit 313 computes an average value ((Pave+Buf[1]×2)÷3). The resolution converting unit 313 causes the memory Buf[1] to store the computing result. The resolution converting unit 313 performs the calculation on the pixels on the third line in the main-scanning direction.

Figure 10:
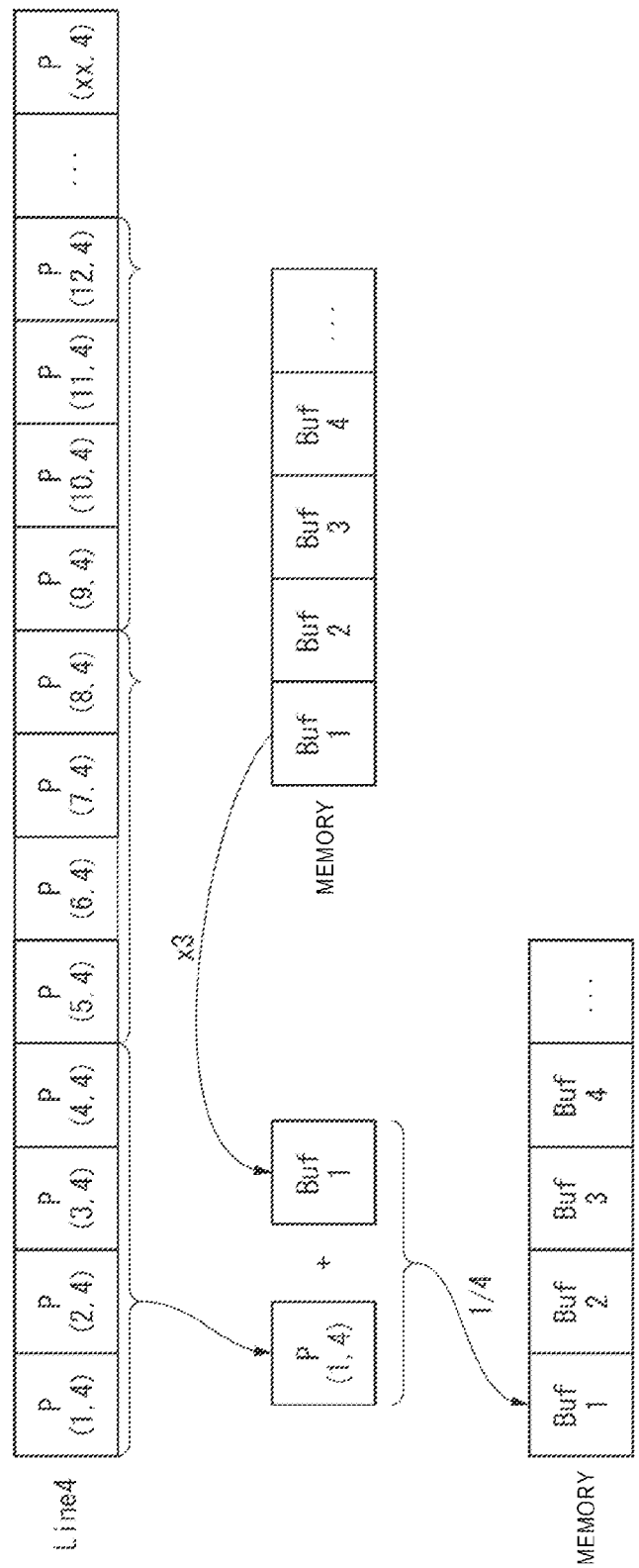
FIG. 10 is a diagram schematically illustrating the resolution converting process of the fourth line in the method of saving the memory amount of the embodiment.

FIG. 10 is a diagram schematically illustrating the resolution converting process of the fourth line in the method of saving the memory amount of the embodiment. The resolution converting unit 313 calculates an average value Pave of four pixels P(1, 4), P(2, 4), P(3, 4), and P(4, 4) on the fourth line in the main-scanning direction. The resolution converting unit 313 acquires values of Buf[1] in which Pave and the average values of the first line, the second line, and the third line are stored. The resolution converting unit 313 computes an average value ((Pave+Buf[1]×3)÷4). The resolution converting unit 313 causes the memory Buf[1] to store the computing result. The resolution converting unit 313 performs the calculation on the pixels on the fourth line in the main-scanning direction.

It is necessary to use a memory that stores data, in the resolution conversion. In order to perform the resolution conversion on 8-bit data of colors RGB of 4×4 pixels, it is necessary to hold an addition value of 16 pixels. In this case, it is necessary to use a total 12-bit memory of 8 bits+4 bits of colors. However, a calculation expression obtained by using the average value obtained to the previous line and the average value obtained on the current line as in the method makes it possible to perform the resolution conversion into 8 bits regardless of the number of lines.

Figure 11:
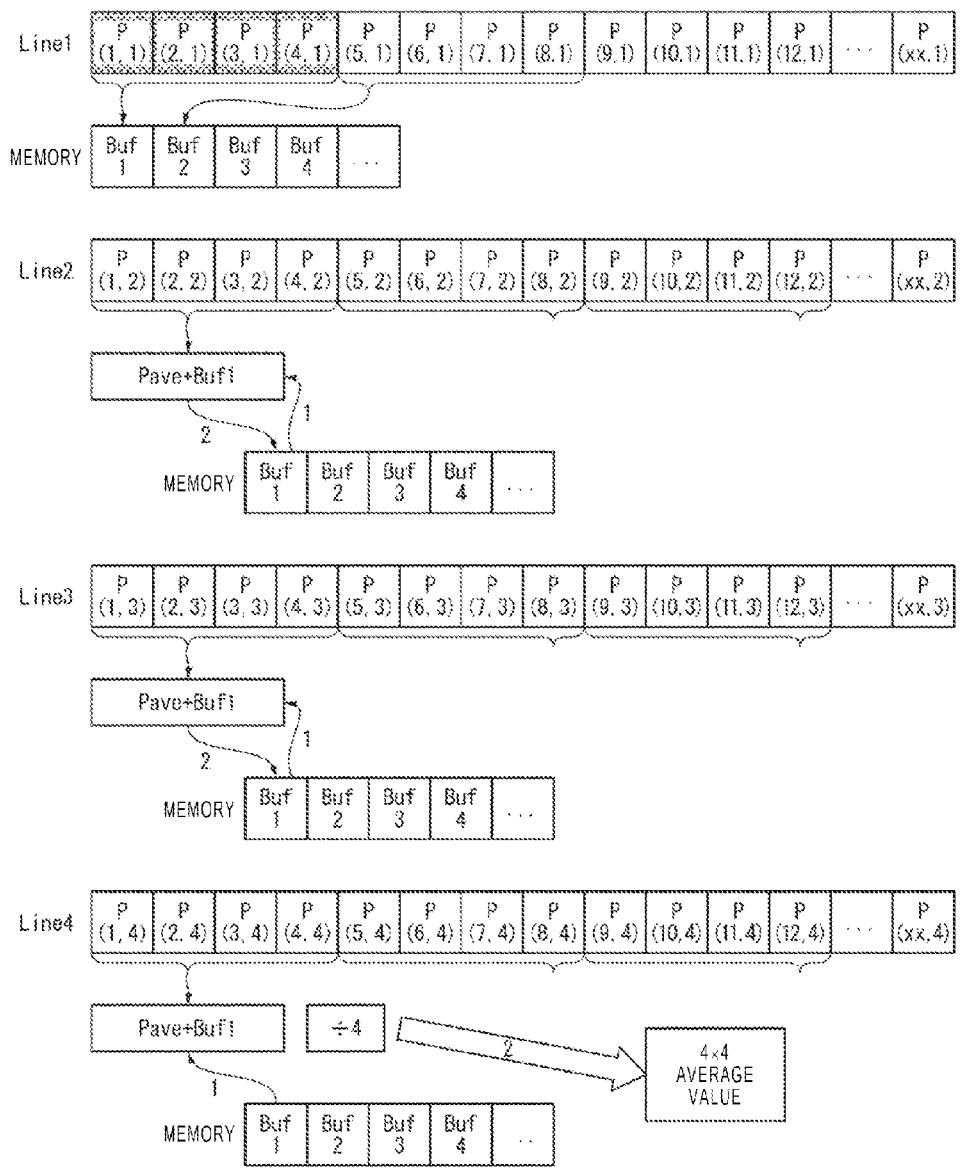
FIG. 11 is a diagram schematically illustrating the resolution converting process in a method of easy circuitization of the embodiment.

FIG. 11 is a diagram schematically illustrating the resolution converting process in a method of easy circuitization of the embodiment. The resolution converting unit 313 calculates an average value Pave of four pixels P(1, 1), P(2, 1), P(3, 1), and P(4, 1) on the first line in the main-scanning direction. The resolution converting unit 313 causes a memory Buf[1] to store Pave. The resolution converting unit 313 performs the calculation of Pave on the pixels on the first line in the main-scanning direction.

The resolution converting unit 313 calculates the average value Pave of four pixels P(1, 2), P(2, 2), P(3, 2), and P(4, 2) on the second line in the main-scanning direction. The resolution converting unit 313 calculates a value of a sum of Buf[1] and Pave. The resolution converting unit 313 causes Buf[1] to store the value of the computed sum. The resolution converting unit 313 performs the calculation of the sum of Buf[1] and Pave of the pixels on the second line in the main-scanning direction.

The resolution converting unit 313 calculates an average value Pave of four pixels P(1, 3), P(2, 3), P(3, 3), and P(4, 3) on the third line in the main-scanning direction. The resolution converting unit 313 calculates a sum of Buf[1] and Pave. The resolution converting unit 313 causes Buf[1] to store the value of the computed sum. The resolution converting unit 313 performs the calculation of a value of a sum of Buf[1] and Pave of the pixels on the third line in the main-scanning direction.

The resolution converting unit 313 calculates the average value Pave of four pixels P(1, 4), P(2, 3), P(3, 3), and P(4, 4) on the fourth line in the main-scanning direction. The resolution converting unit 313 calculates the value of the sum of Buf[1] and Pave. The resolution converting unit 313 calculates an average value (Buf[1]÷4). The resolution converting unit 313 causes Buf[1] to store the computed average value. The resolution converting unit 313 performs the calculation of the average value on the pixels on the fourth line in the main-scanning direction.

The memory, which needs to be used in the method of easy circuitization, needs an average of 8 bits in the case of two lines. In the case of three lines, it is necessary to have an average of 9 bits. In a case of four or five lines, it is necessary to have an average of 10 bits. In a case of six to nine lines, it is necessary to have an average of 11 bits. In a case of 10 to 17 lines, it is necessary to have an average of 12 bits. In the case of 18 to 33 lines, it is necessary to have an average of 13 bits.

Figure 12:
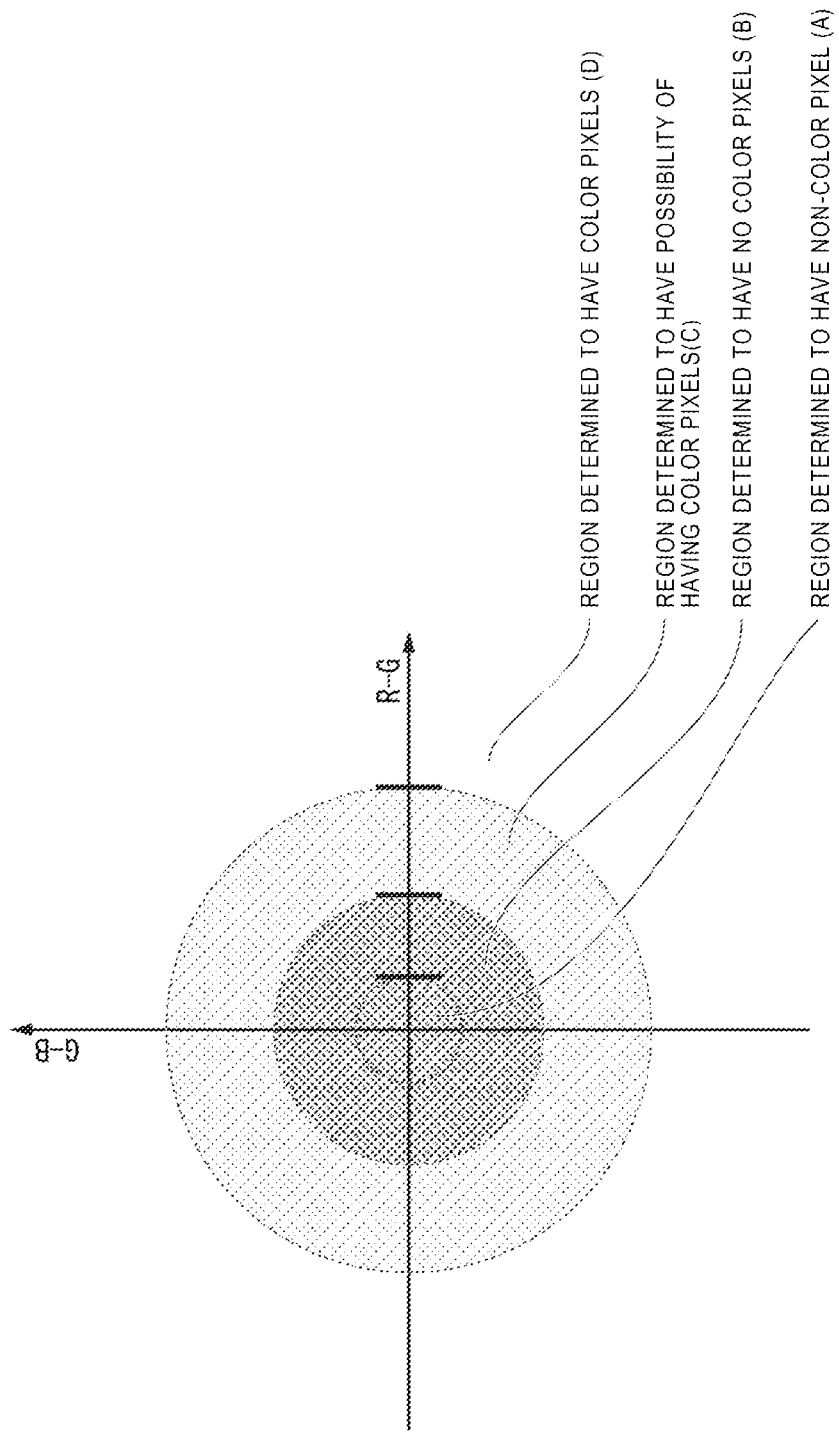
FIG. 12 is a diagram illustrating a specific example of a relationship between a coloring value and a region of a circle of the pixel of the embodiment.

FIG. 12 is a diagram illustrating a specific example of a relationship between a coloring value and a region of a circle of the pixel of the embodiment. The closer the computed result in the RGB type is to 0, the closer the computed result is to the center of the circle. Therefore, a region (A) close to the center of the circle is a region that is determined to have non-color pixels. As the computed results are separated from the center of the circle, there are provided a region (B) in which the pixels are determined not to be the color pixels, a region (C) in which there is a possibility that the pixels will be determined to be the color pixels, and a region (D) in which the pixels are determined to be the color pixels. In the embodiment, the coloring values are contained in any of the four regions of the regions (A) to (D). In addition, the regions may be divided into five or more regions.

Hereinafter, a specific example of a process in which the color pixel determining unit 315 performs color pixel determination, based on the regions of circles in FIG. 12 is described in detail. If the coloring value is within the region (C), the color pixel determining unit 315 performs the determination, based on a coloring value and a brightness value of peripheral pixels of the target pixel. A brightness value L is obtained by using a brightness value calculating expression (L=αR+βG+γB). Here, α, β, and γ are conversion factors. The larger the value of L, the brighter the pixels are determined to be. It is desirable that the peripheral pixels be eight neighboring pixels around the target pixel, or the peripheral pixels may be four neighboring pixels.

The color pixel determining unit 315 determines whether or not the value of L satisfies a predetermined condition, thereby determining whether or not the target pixels neighbor on a black pixel. The color pixel determining unit 315 performs switching of the color determining processes in response to the determination result. The predetermined condition is that, for example, the value of L is smaller than a black threshold value. The black threshold value is a predetermined threshold value. If the value of L is smaller than the black threshold value, the color pixel determining unit 315 determines that the target pixel is not bright. In this respect, if the value of L is larger than or equal to the black threshold value, the color pixel determining unit 315 determines that the target pixel is bright. The predetermined condition may be any conditions as long as the determination of whether or not the target pixel is bright is performed under the conditions.

If the target pixel is determined not to be bright, the color pixel determining unit 315 obtains, of the peripheral pixels of the target pixel, the number of pixels DK that are determined to have the coloring value which is within the region (A). Further, the color pixel determining unit 315 obtains, of the peripheral pixels of the target pixel, the number of pixels DC that are determined to have the coloring value which is within the region (C) or (D). The color pixel determining unit 315 compares DK and DC to threshold values C1 and K1. The threshold values C1 and K1 are predetermined. K1 is an example of the first threshold value. C1 is an example of the second threshold value. If a relationship of (DC>C1 and DK<K1) is established, the color pixel determining unit 315 determines that the target pixel is the color pixel. If the relationship is not established, the color pixel determining unit 315 determines that the target pixel is the non-color pixel.

Of the peripheral pixels around the target pixel, the number LK of pixels that are determined to have the coloring value within the range (A) and the value of L of the peripheral pixels satisfies the predetermined condition is obtained. The predetermined condition is that, for example, the value of L is smaller than the white threshold value. The white threshold value is a predetermined threshold value. If the value of L is smaller than the white threshold value, the color pixel determining unit 315 determines that the target pixel is dark. In this respect, if the value of L is larger than or equal to the white threshold value, the color pixel determining unit 315 determines that the target pixel is not dark. The color pixel determining unit 315 obtains, of the peripheral pixels of the target pixel, the number of pixels LC that are determined to have the coloring value which is within the region (C) or (D). The color pixel determining unit 315 compares LK and LC to threshold values C2 and K2. The threshold values C2 and K2 are predetermined. K2 is an example of the third threshold value. C2 is an example of the fourth threshold value. If a relationship of (LC>C2 and LK<K2) is established, the color pixel determining unit 315 determines that the target pixel is the color pixel. If the relationship is not established, the color pixel determining unit 315 determines that the target pixel is the non-color pixel.

Figure 13:
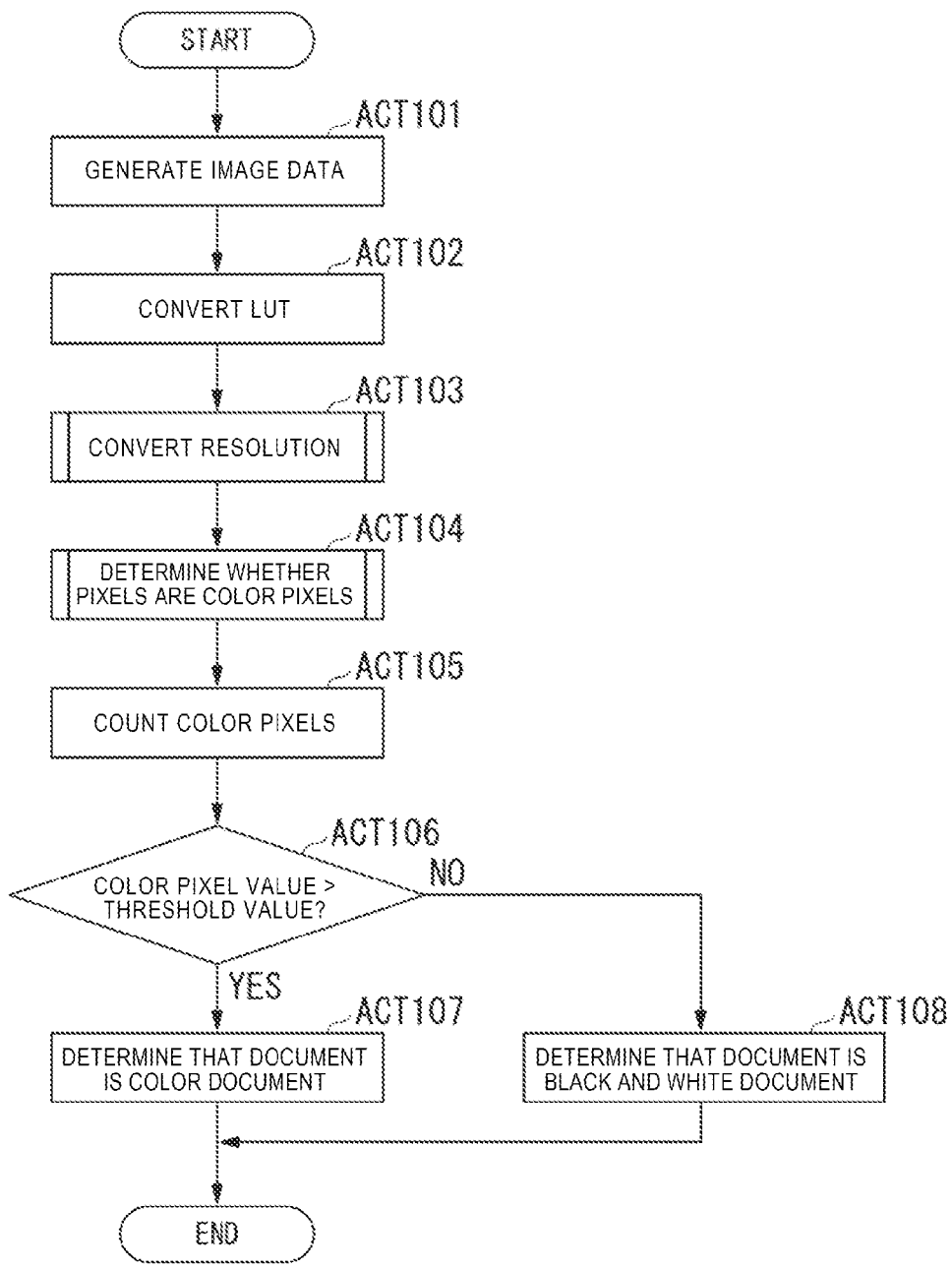
FIG. 13 is a flowchart illustrating flow of a process of color or non-color determination of the embodiment.

FIG. 13 is a flowchart illustrating flow of a process of the color or non-color determination of the embodiment. The reading control unit 211 reads, in a raster format, the original document disposed in the image reading device 200 and generates the image data (ACT101). The LUT converting unit 312 performs an LUT converting process on the values of the RGB signals of the generated image data (ACT102). The resolution converting unit 313 decreases the image resolution of the image data through the resolution converting process (ACT103). As the resolution converting process, any methods may be used as long as it is possible to decrease the screen resolution. The coloring value calculating unit 314 calculates the coloring value of the target pixel. The color pixel determining unit 315 determines whether or not the target pixel is the color pixel, based on the coloring value (ACT104). The counting unit 316 counts the number of pixels which are determined to be the color pixels by the color pixel determining unit 315 (ACT105). The counting unit 316 determines whether or not the number of color pixels is larger than the predetermined threshold value (ACT106). If the number of color pixels is larger than the predetermined threshold value (ACT106: YES), the counting unit 316 determines that the original document is the color original document (ACT107). If the number of color pixels is not larger than the predetermined threshold value (ACT106: NO), the counting unit 316 determines that the original document is the black and white original document (ACT108).

Figure 14:
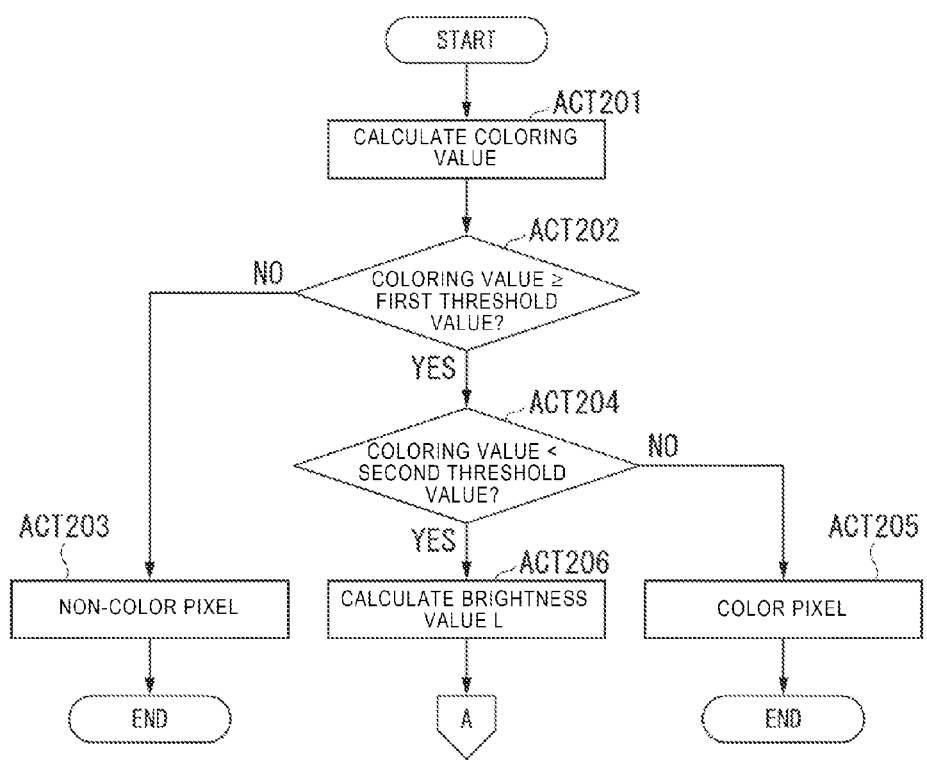
FIG. 14 is a flowchart illustrating flow of a process of color pixel determination of the embodiment.
Figure 15:
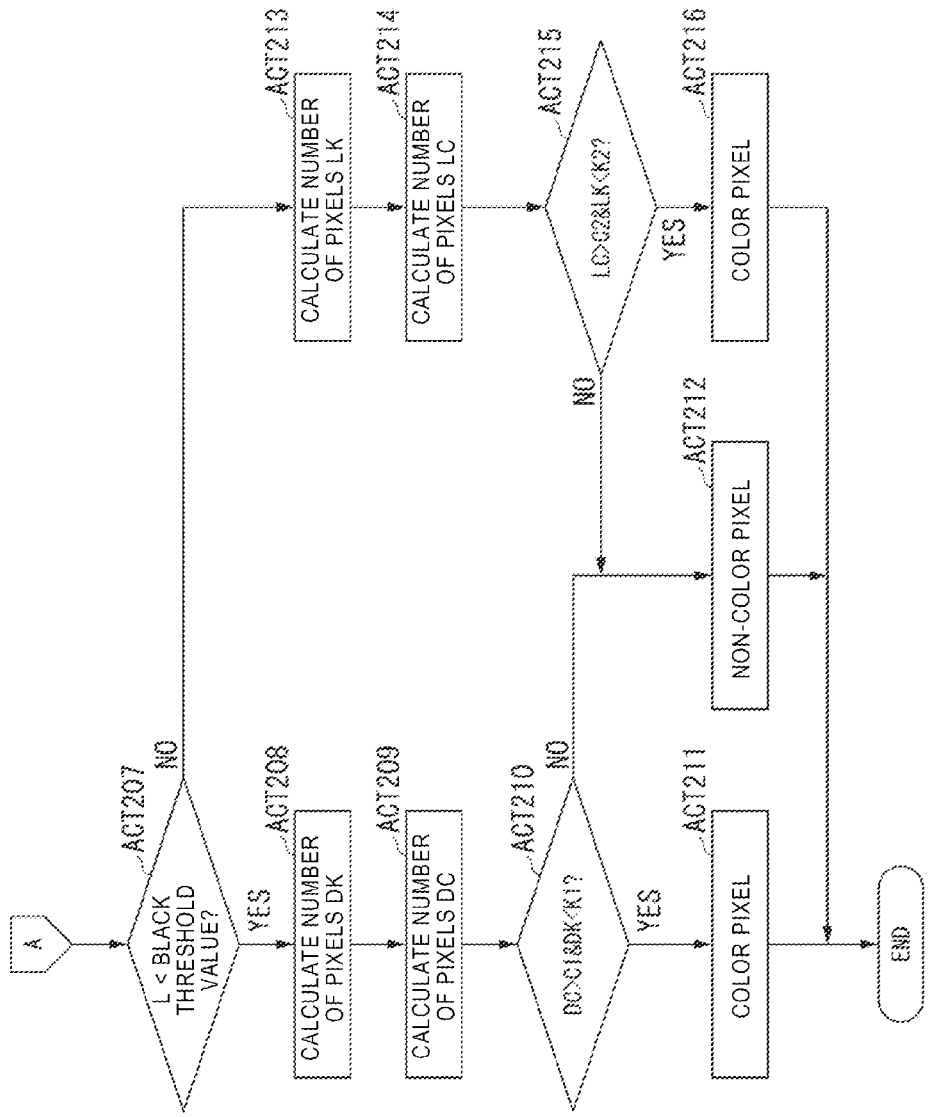
FIG. 15 is a flowchart illustrating flow of another process of color pixel determination of the embodiment.

FIGS. 14 and 15 are a flowchart illustrating flow of a process of the color pixel determination of the embodiment. The coloring value calculating unit 314 calculates the coloring value of the target pixel (ACT201). The color pixel determining unit 315 determines whether or not the coloring value is larger than or equal to the first threshold value (ACT202). The first threshold value is a value on a border between the regions (B) and (C). If the values of the RGB signals are not larger than or equal to the first threshold value (ACT202: NO), the color pixel determining unit 315 determines that the target pixel is the non-color pixel and ends the process (ACT203). If the coloring value is larger than equal to the first threshold value (ACT202: YES), the color pixel determining unit 315 determines whether or not the coloring value is smaller than the second threshold value (ACT204). The second threshold value is a value on a border between the region (C) and the region (D). If the values of the RGB signals are not smaller than the second threshold value (ACT204: NO), the color pixel determining unit 315 determines that the target pixel is the color pixel and ends the process (ACT205). If the coloring value is smaller than the second threshold value (ACT204: YES), the color pixel determining unit 315 calculates the value of a brightness relationship expression L of the target pixel (ACT206).

The color pixel determining unit 315 determines whether or not the value of L is smaller than the black threshold value (ACT207). If the value of L is smaller than the black threshold value (ACT207: YES), the color pixel determining unit 315 calculates, of the peripheral pixels, the number of pixels DK that are determined to have the coloring value which is within the region (A) (ACT208). The color pixel determining unit 315 calculates, of the peripheral pixels of the target pixel, the number of pixels DC that are determined to have the coloring value which is within the region (C) or (D) (ACT209). The color pixel determining unit 315 determines whether or not an expression of (DC>C1 and DK<K1) is established (ACT210). C1 and K1 are predetermined threshold values. If the expression of (DC>C1 and DK<K1) is established (ACT210: YES), the color pixel determining unit 315 determines that the target pixel is the color pixel and ends the process (ACT211). If the expression of (DC>C1 and DK<K1) is not established (ACT210: NO), the color pixel determining unit 315 determines that the target pixel is the non-color pixel and ends the process (ACT212).

If the value of L is not smaller than the black threshold value (ACT207: NO), the color pixel determining unit 315 calculates, of the peripheral pixels of the target pixel, the number LK of pixels that have been determined to have the coloring value within the region (A) and have the value of L of the peripheral pixels which satisfies the predetermined condition (ACT213). The predetermined condition is that, for example, the value of L is smaller than the white threshold value. The color pixel determining unit 315 calculates, of the peripheral pixels of the target pixel, the number of pixels LC that are determined to have the coloring value which is within the region (C) or (D) (ACT214). The color pixel determining unit 315 determines whether or not an expression of (LC>C2 and LK<K2) is established (ACT215). C2 and K2 are predetermined threshold values. If the expression of (LC>C2 and LK<K2) is established (ACT215: YES), the color pixel determining unit 315 determines that the target pixel is the color pixel and ends the process (ACT216: YES). If the expression of (LC>C2 and LK<K2) is not established (ACT215: NO), the color pixel determining unit 315 determines that the target pixel is the non-color pixel and ends the process (ACT212).

As described above, the color pixel determining unit 315 determines whether the target pixel is the color pixel or the non-color pixel, based on the coloring value obtained from the values of the RGB signals of the target pixel. In addition, if the coloring value is within the region (C) in which it is possible to determine that the pixel is the color pixel, the color pixel determining unit 315 performs determination of whether or not the brightness of the target pixel satisfies the predetermined condition.

If the brightness of the target pixel satisfies the predetermined condition, when the number of the color pixels of the peripheral pixels is larger than the predetermined number and the number of the non-color pixels of the peripheral pixels is smaller than the predetermined number, the color pixel determining unit 315 determines that the target pixel is the color pixel. If the brightness of the target pixel does not satisfy the predetermined condition, when the number of the pixels that are determined to be dark in the peripheral pixels is small and the number of the color pixels of the peripheral pixels is larger than the predetermined number, the color pixel determining unit 315 determines that the target pixel is the color pixel.

Hence, further determination is performed on the pixels that are determined to have the coloring value with which it is possible to be the color pixel, and thereby it is possible to perform color determination with small occurrence of erroneous determination.

Further, the resolution converting unit 313 decreases the image resolution of the image data, and thereby the noise contained in the image data is reduced. Then, the color determining process is performed, which enables the possibility of the erroneous determination to be further reduced.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. An image forming apparatus comprising:
   a resolution converting unit that decreases image resolution of read image data;
   a color information calculating unit that calculates a color information value of a target pixel for determining whether the target pixel is a color pixel, a non-color pixel, or a color pixel candidate, based on a value of an RGB signal of the target pixel which forms the read image data; and a color pixel determining unit that determines whether the target pixel determined as the color pixel candidate by the color information calculating unit is either the color pixel or the non-color pixel, based on brightness of the target pixel;

first counted number of peripheral pixels around the target pixel, having the color information value smaller than a first threshold value; and second counted number of the peripheral pixels around the target pixel, having the color information value larger than or equal to a second threshold value, wherein the first threshold value and the second threshold value are varied in accordance with the brightness of the target pixel.

2. The apparatus according to claim 1, wherein the color pixel determining unit determines that the target pixel is the non-color pixel if the color information value is smaller than a value with which the target pixel is determined not to be the color pixel, and determines that the target pixel is the color pixel if the color information value is larger than or equal to a value with which the target pixel is determined to be the color pixel, and if the color information value is a value other than the values, the target pixel is determined to be either the color pixel or the non-color pixel, based on a brightness value representing brightness of the target pixel.

3. The apparatus according to claim 2, wherein the color pixel determining unit determines a determination condition used when determining whether the target pixel is either the color pixel or the non-color pixel, depending on the brightness value.

4. The apparatus according to claim 1, further comprising:
a counting unit that counts the number of pixels which are determined to be the color pixels.

5. The apparatus according to claim 4, wherein the counting unit determines that the image data is a color original document if the number of the pixels is a predetermined number or larger.

6. The apparatus according to claim 1, further comprising:
an LUT converting unit that uniquely determines a value of an RGB signal which is output depending on the value of the RGB signal of the read image data.

7. The apparatus according to claim 1, further comprising:
a controller for executing operations.

8. The apparatus according to claim 7, wherein
the controller comprises an ASIC.

9. The apparatus according to claim 7, wherein
the resolution converting unit processes an average value of about four pixels per operation.

10. An image forming apparatus comprising:
a resolution converting unit that decreases image resolution of read image data;

a color information calculating unit that calculates a color information value of a target pixel for determining whether the target pixel is a color pixel, a non-color pixel, or a color pixel candidate, based on a value of an RGB signal of the target pixel which forms the read image data; and a color pixel determining unit that determines whether the target pixel determined as the color pixel candidate by the color information calculating unit is either the color pixel or the non-color pixel, based on brightness of the target pixel;

first counted number of peripheral pixels around the target pixel, having the color information value smaller than a first threshold value; and second counted number of the peripheral pixels around the target pixel, having the color information value larger than or equal to a second threshold value, wherein the first threshold value and the second threshold value are varied in accordance with the brightness of the target pixel, and a brightness value represents brightness of the target pixel, if a number of the peripheral pixels around the target pixel have the color information value which is smaller than a value with which the peripheral pixels are determined to be non-color pixels is smaller than the first threshold value, and the number of the peripheral pixels having the color information value which is larger than or equal to a value with which it is possible for the peripheral pixels to be the color pixels is larger than the second threshold value, the color pixel determining unit determines that the target pixel is the color pixel when the brightness value is smaller than a black threshold value, and otherwise determines that the target pixel is the non-color pixel.

11. The apparatus according to claim 10, wherein
the peripheral pixels are about eight neighboring pixels around the pixel.

12. An image forming apparatus comprising:
a resolution converting unit that decreases image resolution of read image data;

a color information calculating unit that calculates a color information value of a target pixel for determining whether the target pixel is a color pixel, a non-color pixel, or a color pixel candidate, based on a value of an RGB signal of the target pixel which forms the read image data; and a color pixel determining unit that determines whether the target pixel determined as the color pixel candidate by the color information calculating unit is either the color pixel or the non-color pixel, based on brightness of the target pixel;

first counted number of peripheral pixels around the target pixel, having the color information value smaller than a first threshold value; and second counted number of the peripheral pixels around the target pixel, having the color information value larger than or equal to a second threshold value, wherein the first threshold value and the second threshold value are varied in accordance with the brightness of the target pixel, and a brightness value represents brightness of the target pixel, if a number of the peripheral pixels around the target pixel have the color information value which is smaller than a value with which the peripheral pixels are determined to be non-color pixels and the brightness value of the peripheral pixels smaller than a white threshold value is smaller than a third threshold value, and the number of the peripheral pixels having a color information value which is larger than or equal to a value with which it is possible for the peripheral pixels to be the color pixels is smaller than the third threshold value, the color pixel determining unit determines that the target pixel is the color pixel when the brightness value is larger than or equal to a black threshold value, and otherwise determines that the target pixel is the non-color pixel.

13. An image forming method performed by an image forming apparatus, comprising:
- decreasing image resolution of read image data;
- calculating a color information value of a target pixel for use in determining whether the target pixel is a color pixel, a non-color pixel, or a color pixel candidate, based on a value of an RGB signal of the target pixel which forms the read image data; and
- determining whether the target pixel determined as the color pixel candidate by the color information calculating unit is either the color pixel or the non-color pixel, based on the color information, and changing a criterion of determining the color pixel based on brightness of the target pixel;
    - first counted number of peripheral pixels around the target pixel, having the color information value smaller than a first threshold value; and
    - second counted number of the peripheral pixels around the target pixel, having the color information value larger than or equal to a second threshold value,
- wherein the first threshold value and the second threshold value are varied in accordance with the brightness of the target pixel.

14. The method according to claim 13, further comprising:
- determining that the target pixel is the non-color pixel if the color information value is smaller than a value with which the target pixel is determined not to be the color pixel;
- determining that the target pixel is the color pixel if the color information value is larger than or equal to a value with which the target pixel is determined to be the color pixel; and
- if the color information value is a value other than the values, determining the target pixel to be either the color pixel or the non-color pixel, based on a brightness value representing brightness of the pixel.

15. The method according to claim 14, further comprising:
- determining a determination condition used when determining whether the target pixel is either the color pixel or the non-color pixel, depending on the brightness value.

16. The method according to claim 15, further comprising:
- if a number of peripheral pixels around the target pixel have the color information value which is smaller than a value with which the peripheral pixels are determined to be non-color pixels is smaller than a first threshold value, and the number of the peripheral pixels having a color information value which is larger than or equal to a value with which it is possible for the peripheral pixels to be the color pixels is larger than a second threshold value, determining that the target pixel is the color pixel when the brightness value is smaller than a black threshold value, and otherwise determining that the target pixel is the non-color pixel.

17. The method according to claim 13, further comprising:
- counting the number of pixels which are determined to be the color pixels.

18. The method according to claim 17, further comprising:
- determining that the image data is a color original document if the number of the pixels is a predetermined number or larger.

19. The method according to claim 13, further comprising:
- uniquely determining a value of an RGB signal which is output depending on the value of the RGB signal of the read image data.

20. The method according to claim 13, wherein
the calculating color information comprises processing an average value of about four pixels per calculating operation.

* * * * *